United States Patent Office 3,591,660
Patented July 6, 1971

---

3,591,660
THERMOPLASTIC COMPOSITIONS FOR THE PREPARATION OF INHERENTLY FLEXIBLE SHEET MATERIALS
Glen H. Graham and Robert R. Blanchard, Port Allen, La., assignors to The Dow Chemical Company, Midland, Mich.
No Drawing. Filed Nov. 22, 1967, Ser. No. 684,925
Int. Cl. C08f 29/24, 29/12
U.S. Cl. 260—897
6 Claims

ABSTRACT OF THE DISCLOSURE

This invention relates to thermoplastic compositions based on intimate blends of certain chlorinated olefin polymers, vinyl chloride polymers and copolymers of ethylene and copolymerizable alkyl esters of an alpha, beta-ethylenically unsaturated acid. These compositions are inherently flexible under usual environmental conditions and retain such flexibility to an unexpected extent at low temperatures.

---

It is known to prepare sheeting materials and the like from blends of vinyl chloride polymers and chlorinated olefin polymers thereby obtaining the beneficial properties of each material, e.g. the high tensile strength obtained from the utilization of the vinyl chloride polymers and the flexibility obtained by utilization of the chlorinated olefin polymers. It is also known that the addition of copolymers composed of ethylene and vinyl acetate to polymeric materials, including chlorinated polyethylene, (U.S. Pat. No. 3,278,645); blends of (1) graft copolymers of vinyl chloride onto chlorinated polyolefins and (2) diene-nitrile rubber (U.S. Pat. No. 3,297,792); and to vinylidene chloride resins (U.S. Pat. No. 3,322,862); will provide desirable enhanced low temperature flexibility and heat-sealability.

It has been discovered however, which discovery forms the present invention, that the use of certain copolymers of ethylene and copolymerizable alkyl esters of an α,β-ethylenically unsaturated acid (as hereinafter more fully defined) as modifying copolymers for blends based on certain inherently flexible chlorinated olefin polymer and vinyl chloride copolymers (with or without the presence of resinous impact strength modifiers for such vinyl chloride polymer), will provide unexpectedly enhanced low temperature flexibility, without adverse effect upon the other desirable properties of the polymeric blend.

More specifically, the compositions of the present invention consist essentially of (1) between about 50 and 70 weight percent of a chlorinated olefin polymer prepared by the suspension chlorination of an olefin polymer having an essentially linear structure, such olefin polymer being selected from the group consisting of polyethylene and interpolymers composed of at least about 90 mole percent ethylene with the remainder being one or more ethylenically unsaturated comonomers; with such chlorinated olefin polymer having a molecular weight of from about 20,000 and 300,000 and containing from about 25 to 50 weight percent of chemically combined chlorine and having a crystallinity of less than about 10 percent when containing about 34 or more weight percent of chlorine, (2) between about 20 and 30 weight percent of a vinyl chloride polymer containing at least about 95 weight percent of polymerized vinyl chloride in the polymer molecule with any remainder being at least one monoethylenically unsaturated comonomer, and (3) between about 5 and 20 weight percent of a copolymer consisting of from about 70 to 92 weight percent of ethylene and from about 30 to 8 weight percent of a copolymerizable alkyl ester of an α,β-ethylenically unsaturated acid having the formula:

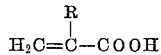

wherein R is alkyl having from 1 to about 8 carbon atoms; the proportions being selected to total 100 weight percent.

The chlorinated polyolefins used in the present invention can be readily obtained by practice of a chlorination procedure which comprehends the suspension chlorination in an inert medium of finely divided essentially linear polyethylene and interpolymers containing at least about 90 mole percent ethylene with the remainder being one or more ethylenically unsaturated comonomers, to a desired total of combined chlorine content, wherein such polymer is first chlorinated at a temperature below its agglomeration temperature for a period sufficient to provide a chlorine content of from about 2 to 23 percent chlorine, based on the total weight of the polymer; followed by the sequential suspension chlorination of such polymer, in a particulate form, at a temperature above its agglomeration temperature but at least about 2° C. below its crystalline melting point for a period sufficient to provide a combined chlorine content of up to about 50 weight percent based on the total weight of the polymer and wherein at least about 2 percent chlorine is added during the sequential chlorination step.

Preferably, the polyolefinic materials to be chlorinated are those distinct species and varieties of essentially linear and unbranched highly porous polymers containing at least about 90 mole percent ethylene in the polymer molecule with a remainder being one or more ethylenically unsaturated comonomers, such polymers being prepared under the influence of catalyst systems comprising admixtures of strong reducing agents such as triethyl aluminum and compounds of Groups IV–B, V–B, and VI–B metals of the Periodic System, such as titanium tetrachloride, and the like, and having a molecular weight less than about 1,000,000 and preferably between about 20,000 and 300,000.

Exemplary of useful ethylenically unsaturated comonomers are the non-aromatic hydrocarbon olefins having 3 or more carbon atoms such as propylene, butene-1 and 1,7-octadiene and the like; cycloaliphatic olefins such as cyclopentene and 1,5-cyclooctadiene and the like; substituted olefins such as acrylic acid and its esters; conjugated diolefins such as butadiene and the like; and the alkenyl aromatic compounds such as styrene and its derivatives, among many other polymerizale materials known to the art.

It has also been found to be of special advantage to carry out the chlorination in the presence of inert substances of inorganic or organic chemical nature which are such that they have an affinity for absorption onto the surfaces of the polyolefin during chlorination so that they may function as barriers to inhibit particle agglomeration. Exemplary of useful inert materials are: carbon black and titanium dioxide and the like. Such materials may be employed for the desired purpose without significantly detracting from the highly desirable elastomeric properties of the polymer. Although the chlorinated olefin polymers used for the purposes of the present invention are preferably prepared in aqueous suspension by the procedure as herein described, it is to be understood that such materials may be prepared by other means, e.g. by solution chlorination techniques, providing the so-formed polymers are of the necessary molecular weight, chlorine content and crystallinity to provide the required flexibility characteristic of the compositions and articles of this invention.

The polymers of vinyl chloride which may be used in the designated amounts include homopolymers of vinyl chloride and interpolymers of vinyl chloride wherein there is present at least about 95 mole percent of vinyl chloride in the polymer molecule. As copolymerization components there can be used vinyl esters such as vinyl acetate, vinyl propionate or vinyl butyrate, vinyl stearate, vinylidene chloride; and esters of aliphatic unsaturated alcohols containing from about 1 to 10 carbon atoms with acrylic acid, methacrylic acid, maleic acid or fumaric acid.

As previously described, the ethylene copolymers utilized consist of from about 70 to 92 weight percent of ethylene and from about 30 to 8 weight percent of a copolymerizable alkyl ester of an α,β-ethylenically unsaturated acid having the formula

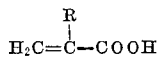

$$H_2C=\overset{R}{\underset{|}{C}}-COOH$$

where R is alkyl having from 1 to about 8 carbon atoms, and wherein such copolymer has a melt index of between about 2.5 and 20 grams/10 minutes. Exemplary of such copolymers are methyl acrylate, ethyl acrylate, propyl acrylate, isopropyl acrylate, butyl acrylate and 2-ethylhexyl acrylate. These copolymers are known in the art and may be prepared by conventional procedures such as the continuous polymerization of the monomer constituents as described by the U.S. Patent No. 2,394,960.

It has also been found that the compositions of the present invention may additionally, and desirably, contain one or more resinous impact strength modifiers without adverse effect upon the unexpectedly enhanced low temperature flexibility provided by the compositions as described herein. In this regard, it is generally preferred to use such modifiers in an amount of from about 5 and 10 weight percent based on the weight of the composition.

Although the present invention contemplates the utilization of any conventionally employed resinous impact strength modifier which is compatible with the vinyl chloride polymer, in the prescribed amounts, particularly good results are obtained by the use of graft copolymers of styrene-acrylonitrile or styrene-isobutylene-acrylonitrile mixtures upon butadiene such as those polymers disclosed and claimed in the U.S. Patent No. 2,802,809. Other useful impact strength modifiers are the thermoplastic acrylic polymers.

Stabilizers may also be included in the compositions to protect the polymeric constituents against possible decomposition by the heat of processing or by subsequent exposure of fabricated sheet material to climatic and environmetal conditions of use. Suitable stabilizers include those materials conventionally employed in the preparation of vinyl polymer and copolymer sheet compositions, e.g. organic complexes and/or salts of lead, tin, barium, cadmium, zinc, sodium, etc., and particularly the sulfur containing organo tin compounds including the alkyl tin mercaptides as well as dibutyl tin laurate and dibutyl tin maleate and various epoxide compounds such as the epoxidized fatty acids and oils, among others. Stabilizers are preferably used in amounts sufficient to provide between about 1 and 10 parts by weight per 100 parts of the polymer constituents. Other conventional additives, such as non-epoxidized fatty acids and oils, and low molecular weight polymers and waxes may also be employed, if desired.

The polymeric compositions of the present invention may be formulated and prepared in any conventional manner, as by dry blending the polymeric ingredients and milling them at elevated temperatures of between about 150 and 200° C. with conventionally employed compounding and milling rolls and the like apparatus. Such compositions are particularly useful for preparation of molten or extruded articles or otherwise shaped or fabricated articles of the rigid, chemically resistant type such as pipes, tubing and the like, and is especially useful as an inherently flexible sheet material for use as an automotive instrument panel cover and the like applications.

The following examples wherein all parts and percentages are to be taken by weight illustrate the present invention but are not to be construed as limiting its scope.

EXAMPLE 1

An inherently flexible chlorinated polyethylene was prepared by adding the following materials in the designated order and ratios:

To 4,000 grams of deionized water was added, with stirring, 200 grams of a polyethylene having an essentially linear and unbranched structure (containing less than about 1 methyl group per 100 methylene units), and having a melt index of about 1 and a molecular weight of about 60,000. Such polyethylene had been previously prepared by a process using a catalyst composed of tri-isobutyl aluminum and titanium tetrachloride. The resulting admixture was then charged to a 1½ gallon autoclave with 8 grams of calcium chloride; about 0.5 cc. of a 70 percent solution of ditertiary butyl peroxide in butanol; and about 10 drops of a commercially available wetting agent.

The charge was then chlorinated, in a first chlorination step, under about 30 p.s.i. (gauge) of chlorine pressure at a temperature of about 90° C. until a chlorine content of about 20 percent was obtained. The charge was then chlorinated in a second suspension chlorination step, at a temperature of about 126° C. until a total chlorine content of about 48 percent was obtained. The chlorination product was then isolated from the dispersion by filtration, washed free of residual hydrochloric acid and dried. The relative crystallinty of such material, was about 2 percent, determined as the ratio of crystalline peak areas to the sum of the amorphous plus crystalline peak areas as determined by conventional X-ray diffraction techniques.

The dried material was then used to prepare the following series of formulations by blending with varying amounts of polyvinyl chloride having an inherent viscosity of from 0.81–0.89 as determined by the ASTM Test No. D 1243 and a K-value of 62.5–65.5; and varying amounts and types of modifying ethylene copolymers.

Series I: Chlorinated polyethylene alone.

Series II: A blend of chlorinated polyethylene and polyvinyl chloride.

Series III: A blend of chlorinated polyethylene, polyvinyl chloride and a copolymer containing 92 weight percent ethylene and 8 weight percent vinyl acetate; such copolymer having a melt index of about 2.0 grams/10 minutes and a low temperature brittleness value of less than about −70° C. as determined by ASTM Test No. D 746.

Series IV: Blends of chlorinated polyethylene, polyvinyl chloride and a copolymer containing 80 weight percent ethylene and 20 weight percent ethyl acrylate; such copolymer having a melt index of about 2.5 grams/10 minutes and a low temperature brittleness value of less than about −70° C. as determined by ASTM Testing No. D 746.

In each instance, individual sheets of about 60 mils in thickness were removed from the rolling mill and compression molded at 370° F.

The following Table I summarizes the amounts and types of materials used and the physical properties of individual test specimens obtained from each formulation.

The column heading of such table having the following meanings:

Ultimate tensile strength: ASTM Test No. D882-61T
Ultimate elongation: ASTM Test No. D882-61T
100% Modulus (tensile stress @ 100% elongation): ASTM Test No. D882-61T
Low temperature brittleness: ASTM Test No. D 796

TABLE I

| | Composition | | | | | Physical properties | | | |
|---|---|---|---|---|---|---|---|---|---|
| | | | Amount (wt. percent) | Ethylene copolymer | | Tensile elongation | | 100% modolus, p.s.i. | Low temp. brittleness, °C. |
| Sample No. | CPE | PVC | | Type | MI | P.s.i. | Percent | | |
| For comparison: | | | | | | | | | |
| Series I: 1 | 100 | None | | None | | 1,020 | | 210 | −34 |
| Series II: 2 | 70 | 30 | | do | | 2,700 | 300 | 1,250 | −29 |
| Series III: 3 | 60 | 30 | 10 | 92% ethylene, 8% V.A. | 2.0 | 2,400 | 300 | 1,200 | −25 |
| The Invention: Series IV: | | | | | | | | | |
| 4 | 60 | 30 | 10 | 80% ethylene, 20% E.A. | 2.5 | 2,600 | 295 | 1,060 | −45−−55 |
| 5 | 50 | 30 | 20 | do | 2.5 | 2,060 | 270 | 1,295 | −45−−55 |
| 6 | 67 | 23 | 10 | do | 2.5 | 2,590 | 390 | 860 | −45−−55 |
| 7 | 60 | 20 | 20 | do | 2.5 | 2,000 | 365 | 870 | −45−−55 |
| 8 | 60 | 27.5 | 12.5 | do | 2.5 | 2,700 | 340 | 1,150 | −45−−55 |
| 9 [1] | 60 | 25 | 6 | do | 2.5 | 2,630 | 320 | 1,700 | −31 |

[1] Additionally contains 9 weight percent of a graft copolymer of styrene-acrylonitrile upon butadiene (Blendex 325).

The data of Table I illustrate that utilization of the defined modifying copolymers of ethylene and ethyl acrylate in the composition comprising the present invention provides unexpectedly enhanced low temperature flexibility (Series IV) as compared to the use of copolymers of ethylene and vinyl acetate (Series III); without significantly adversely affecting the desirable physical strength properties of the mixture of chlorinated polyethylene and polyvinylchloride (Series II).

Similar good results are obtained utilizing any of the compositions described herein as comprising the present invention.

By way of further comparison, it has been found that utilization of chlorinated olefin polymers having molecular weights exceeding 1 million are generally incapable of being fabricated into sheet-like structures without the addition of significant amounts of plasticizers or other processing aids. By way of illustration, it has been found that the non-plasticized chlorinated polyolefin as described in Example I above can be extruded through a standard Instron Rheometer orifice, using a 1900° C. barrel temperature, at a 150 sec. shear rate with a resultant shear stress of from 25–35 p.s.i., whereas under the same conditions chlorinated polyethylene having a molecular weight of from 1 million to 5 million are characterized by a shear stress of greater than about 85 p.s.i. and often cannot be made to pass through the orifice of the rheometer.

Still further, it has been found that utilization of chlorinated polyolefins as herein described, but having a chlorine content of greater than about 50 weight percent provides sheet material having reduced resistance to heat. Also, chlorinated polyolefins, as herein described, but having a chlorine content of less than about 25 weight percent have less resistance to burning.

It has also been found that utilization of the defined modifying ethylene copolymers in amounts less than about 5 weight percent are ineffective in providing the required low temperature flexibility, and that amounts in excess of about 20 weight percent are unnecessary and may significantly affect the physical strength properties of the described compositions. Further, utilization of such modifying ethylene copolymers having the defined alkyl structure is necessary for required compatibility and fabrication purposes.

It is a further requirement of the present invention that the prescribed amounts of chlorinated olefin polymer and vinyl chloride polymer be used to obtain necessary physical strength and flexibility and to permit the obtainment of low temperature flexibility upon addition of the prescribed amounts and types of modifying ethylene copolymers; this latter effect depending upon necessary compatibility of the ethylene copolymer with the remaining polymeric ingredients.

What is claimed is:

1. A thermoplastic composition consisting essentially of an intimate blend of
   (1) between about 50 and 70 weight percent of a chlorinated olefin polymer prepared by the chlorination of an olefin polymer having an essentially linear structure, said olefin polymer being selected from the group consisting of polyethylene and interpolymers composed of at least about 90 mole percent ethylene with the remainder being one or more ethylenically unsaturated comonomer; said chlorinated olefin polymer having a molecular weight of from about 20,000 and 300,000 and containing from about 25 to 50 weight percent of chemically combined chlorine and having a crystallinity of less than about 10 percent when containing about 34 or more weight percent of chlorine,
   (2) between about 20 to 30 weight percent of a vinyl chloride polymer containing at least about 95 weight percent of polymerized vinyl chloride in the polymer molecule with any remainder being at least one monoethylenically unsaturated comonomer, and
   (3) between about 5 to 20 weight percent of a copolymer consisting of from about 70 to 92 weight percent of ethylene and from about 30 to 8 weight percent of a copolymerizable alkyl ester of an α,β-ethylenically unsaturated acid having the formula:

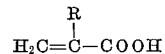

$$H_2C=\underset{\underset{R}{|}}{C}-COOH$$

wherein R is alkyl having from 1 to about 8 carbon atoms, the proportions being selected to total 100 weight percent.

2. The composition of claim 1 wherein said chlorinated olefin polymer is chlorinated polyethylene.

3. The composition of claim 1 wherein said vinyl chloride polymer is polyvinyl chloride.

4. A thermoplastic composition consisting essentially of an intimate blend of
   (1) between about 50 and 70 weight percent of a chlorinated polyethylene prepared by the chlorination of an ethylene polymer, said chlorinated polyethylene having a molecular weight of from about 20,000 and 300,000 and containing from about 25 to 50 weight percent of chemically combined chlorine and having a crystallinity of less than about 10 percent when containing about 34 or more weight percent of chlorine,
   (2) between about 20 and 30 weight percent of polyvinyl chloride, and (3) between about 5 and 20 weight percent of a copolymer consisting of (a) about 80 weight percent of ethylene and (b) about 20 weight percent of ethyl acrylate; the proportions being selected to total 100 weight percent.

5. The composition of claim 4 wherein said chlorinated polyethylene contains about 48 weight percent chlorine.

6. The composition of claim 5 wherein said chlorinated polyethylene is prepared in aqueous suspension by first chlorinating said ethylene polymer at a temperature below its agglomeration temperature up to a chlorine content of between about 2 and 23 percent and then chlorinating said ethylene polymer in a second stage at a temperature above the agglomeration temperature but below the crystalline melting point of said ethylene polymer and wherein at least about 2 percent chlorine is added during the second stage.

References Cited

UNITED STATES PATENTS

| 3,291,863 | 12/1966 | Frey et al. | 260—897C |
| 3,283,035 | 11/1966 | Schnebelen | 260—897C |
| 3,062,778 | 11/1962 | Van Cleve et al. | 260—897C |

FOREIGN PATENTS

| 626,534 | 8/1961 | Canada | 260—876 |
| 924,457 | 4/1963 | Great Britain | 260—897 |

MURRAY TILLMAN, Primary Examiner

H. ROBERTS, Assistant Examiner

U.S. Cl. X.R.

260—29.6, 94.9, 876